(12) United States Patent
Henriksson

(10) Patent No.: US 10,286,502 B2
(45) Date of Patent: May 14, 2019

(54) METHOD AND ARRANGEMENT FOR REPAIRING A PLATE PACK OF A HEAT EXCHANGER

(71) Applicant: VAHTERUS OY, Kalanti (FI) (FI)

(72) Inventor: Timo Henriksson, Turku (FI)

(73) Assignee: VAHTERUS OY, Kalanti (FI)

( * ) Notice: Subject to any disclaimer, the term of this patent is extended or adjusted under 35 U.S.C. 154(b) by 657 days.

(21) Appl. No.: 14/404,536

(22) PCT Filed: May 28, 2013

(86) PCT No.: PCT/FI2013/050580
§ 371 (c)(1),
(2) Date: Nov. 28, 2014

(87) PCT Pub. No.: WO2013/178879
PCT Pub. Date: Dec. 5, 2013

(65) Prior Publication Data
US 2015/0144313 A1    May 28, 2015

(30) Foreign Application Priority Data

May 28, 2012 (FI) ........................... 20125568

(51) Int. Cl.
*F28F 11/00* (2006.01)
*B23P 6/00* (2006.01)
(Continued)

(52) U.S. Cl.
CPC ............ *B23P 15/26* (2013.01); *F28D 9/0006* (2013.01); *F28D 9/0043* (2013.01); *F28F 3/08* (2013.01);
(Continued)

(58) Field of Classification Search
CPC ........ B23P 6/00; B23P 15/26; Y10T 29/49352; F28F 11/00
(Continued)

(56) References Cited

U.S. PATENT DOCUMENTS

| 3,372,453 A | | 3/1968 | Butt | |
|---|---|---|---|---|
| 4,249,597 A | * | 2/1981 | Carey | ................. F28D 9/005 165/70 |

(Continued)

FOREIGN PATENT DOCUMENTS

| FR | 2 930 632 | 10/2009 |
|---|---|---|
| GB | 2 157 389 | 10/1985 |

(Continued)

OTHER PUBLICATIONS

International Search Report for PCT/FI2013/050580, dated Oct. 21, 2013.
(Continued)

*Primary Examiner* — Leonard R Leo
(74) *Attorney, Agent, or Firm* — Nixon & Vanderhye P.C.

(57) ABSTRACT

A method and arrangement for repairing a leaking point in a plate pack of a plate heat exchanger (1), in which a space between adjacent plate pairs of the plate pack (4), with which the leaking point is in connection, is closed by arranging a separate strip (9) or sealing tape (10) into the space between the plate pairs on the whole length of the outer perimeter of the plate pack.

4 Claims, 2 Drawing Sheets

Figure 1:
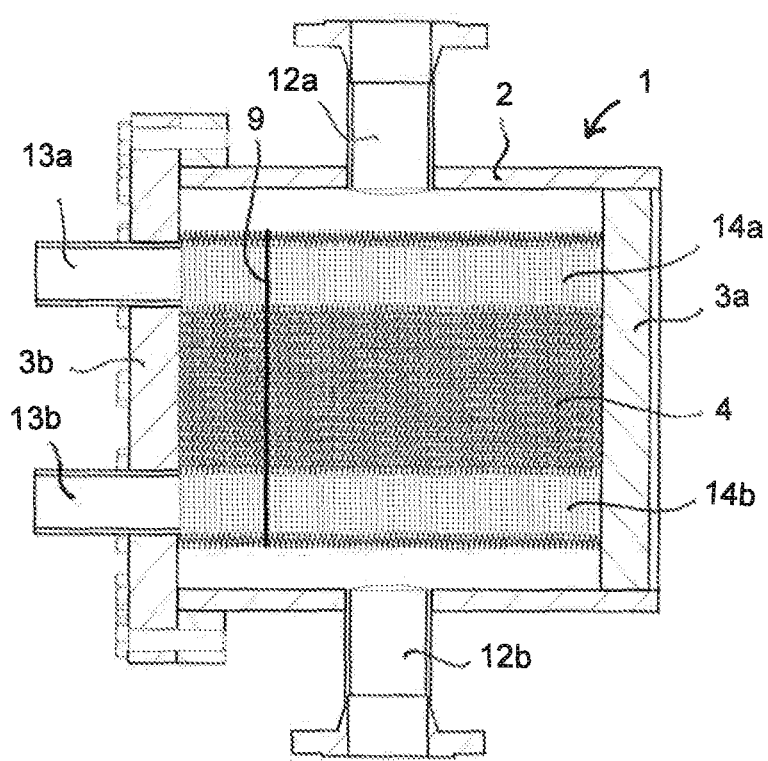

(51) Int. Cl.
*F28D 9/00* (2006.01)
*F28F 3/08* (2006.01)
*B23P 15/26* (2006.01)

(52) U.S. Cl.
CPC ............... *F28F 11/00* (2013.01); *B23P 6/00* (2013.01); *F28F 2280/02* (2013.01); *Y10T 29/49352* (2015.01); *Y10T 29/53113* (2015.01)

(58) Field of Classification Search
USPC ........... 165/70, 76, 166; 29/890.031, 420.09, 29/420.16
See application file for complete search history.

(56) References Cited

U.S. PATENT DOCUMENTS

| | | | | |
|---|---|---|---|---|
| 4,310,960 A * | 1/1982 | Parker | ............... | B23P 15/26 165/166 |
| 2003/0000688 A1* | 1/2003 | Mathur | ............... | F28D 9/0006 165/167 |
| 2011/0258853 A1* | 10/2011 | Saulnier | ............... | F28D 9/0062 29/890.031 |

FOREIGN PATENT DOCUMENTS

| | | | |
|---|---|---|---|
| JP | 57037154 A | * | 3/1982 |
| WO | WO 2012/011866 | | 1/2012 |

OTHER PUBLICATIONS

Written Opinion of the International Searching Authority for PCt/FI2013/050580, dated Oct. 21, 2013.
Finland Search Report for FI Application No. 20125568, dated Mar. 20, 2013.

* cited by examiner

METHOD AND ARRANGEMENT FOR REPAIRING A PLATE PACK OF A HEAT EXCHANGER

This application is the U.S. national phase of International Application No. PCT/FI2013/050580 filed 28 May 2013 which designated the U.S. and claims priority to FI Patent Application No. 20125568 filed 28 May 2012, the entire contents of each of which are hereby incorporated by reference.

FIELD OF THE INVENTION

The object of the invention is the method and arrangement according to the preambles of the enclosed independent claims for repairing a plate pack of the Plate&Shell-type plate heat exchanger, and a plate heat exchanger.

BACKGROUND OF THE INVENTION

A damaged tube of a tube heat exchanger has traditionally been repaired by plugging the damaged tube at the end plates. The plugging has most commonly been made by closing the ends of the tube by welding, whereby the heat exchange medium cannot flow through the damaged tube. In tube heat exchangers having several tubes, plugging one or a few tubes has however not essentially affected the efficiency of the heat exchanger.

A repairing method for a plate heat exchanger has been presented, i.a. in patent publication WO 2012011866, where the plate space adjacent to a damaged plate is closed by pumping filling material between the plates. Thereby the leaking point in the plate has been closed with the material, but the plate space filled with the material is thereafter no longer usable.

Plate heat exchangers of the Plate&Shell-type comprise a plate pack formed of heat exchange plates having openings, in which plate pack the heat exchange plates are attached to each other as plate pairs, the inner parts of which plate pairs are arranged in connection with each other via flow channels formed by the openings of the heat exchange plates. A primary circuit of the heat exchanger is formed of the flow channels formed by the openings of the heat exchange plates and the inner parts of the plate pairs that are in connection with these flow channels. An outer casing of the heat exchanger surrounds the plate pack. A secondary circuit of the heat exchanger is formed of the shell part of the heat exchanger, which shell part is in connection with the spaces between the plate pairs of the plate pack. Problems may arise in such Plate&Shell-type heat exchangers when leaking points are formed in the flow channels passing through the plate pack or in the middle parts of the plates of the plate pack. The plate spaces or the flow channels cannot be easily fixed due to the fully welded structure of the heat exchanger.

OBJECT AND DESCRIPTION OF THE INVENTION

An object of the present invention is to reduce or even eliminate the above-mentioned problems appearing in prior art in connection with repairing leaking points in a plate pack of a Plate&Shell-type heat exchangers.

An object of the present invention is thus to present a method for repairing a Plate&Shell-type heat exchanger that enables repairing leaking points in the flow channels passing through the plate pack formed by the openings of the heat exchanger plates or in the plates of the plate pack.

To achieve this object, the method and arrangement according to the invention is primarily characterised in what is presented in the characterising parts of the independent claims.

The other, dependent claims present some preferred embodiments of the invention.

Typically a plate pack of a plate heat exchanger comprises heat exchange plates having openings and arranged on top of each other, the perimeters of which define the outer surface of the plate pack and which plates are attached to each other as plate pairs in such a manner that
    the inner parts of the plate pairs are arranged in connection with each other through the flow channels formed by the openings of the heat exchange plates, whereby a primary circuit of the heat exchanger is formed to the inner parts of the plate pairs, and
    the spaces between the plate pairs are arranged in connection with each other through the outer surface of the plate pack, whereby plate spaces of a secondary circuit are in the spaces between adjacent plate pairs.

In a typical method according to the invention for repairing a leaking point in a plate pack of a plate heat exchanger the space between adjacent plate pairs of a plate pack, with which the leaking point is in connection, is closed by arranging a separate strip or sealing tape into the space between the plate pairs on the whole length of the outer perimeter of the plate pack.

Respectively in a typical arrangement according to the invention for repairing a leaking point in a plate pack of a plate heat exchanger a separate strip or sealing tape has been arranged into the space between adjacent plate pairs, with which the leaking point is in connection, on the whole length of the outer perimeter of the plate pack for closing the plate space from the flow of the secondary circuit.

A typical Plate&Shell-type heat exchanger according to the invention comprises at least
    a plate pack formed of heat exchange plates having openings and arranged on top of each other, in which plate pack heat exchange plates are attached to each other as plate pairs, the inner parts of which plate pairs are arranged in connection with each other via flow channels formed by the openings of the heat exchange plates,
    an outer casing surrounding the plate pack, which casing comprises end plates mainly in the direction of the ends of the plate pack and a shell connecting the end plates,
    inlet and outlet connections arranged through the outer casing for a first heat exchange medium, which connections are arranged in connection with the inner parts of the plate pack, that is, with the flow channels formed by the openings of the heat exchange plates and the inner parts of the plate pairs, whereby a primary circuit of the plate heat exchanger is formed between the inlet and outlet connection of the first heat exchange medium,
    inlet and outlet connections arranged through the outer casing for a second heat exchange medium, which connections are arranged in connection with the outside of the plate pack, whereby a secondary circuit of the plate heat exchanger is formed between the inlet and outlet connections of the second heat exchange medium, whereby the plate spaces of the secondary circuit are between adjacent plate pairs, and
    in which heat exchanger at least one space between plate pairs of a plate pack is closed with a method according to the invention for repairing a leaking point in the plate pack.

In a typical method according to the invention for repairing a leaking point in a plate pack of the plate heat exchanger the space between adjacent plate pairs of a plate pack, with which the leaking point is in connection, is closed by arranging a separate strip or sealing tape in between the plate pairs on the whole length of the outer perimeter of the plate pack. The leaking point is typically in a heat exchange plate or in the wall of the flow channel connecting the openings of the heat exchange plates to each other.

The repairing method of a plate pack according to the invention is based on the fact that by closing a heat exchange space of the shell side of the heat exchanger, that is, in the secondary circuit, on its outer perimeter, this part is fully separated from the flows of the shell side and it is allowed to be filled with the heat exchange medium of the pack side. Thereby the leaking point formed in the heat exchange plate or in the flow channel does no longer cause mixing of the heat exchange mediums of the primary and secondary circuits, but instead through the leaking point the adjacent plate pairs and the space in between them all belong to the pack side, that is, to the primary circuit. The repairing method according to the invention thus enables still using the damaged plate space for heat exchange purposes.

The repairing method according to the invention is meant specifically for heat exchangers according to the Plate&Shell-technology that are comprised of a plate pack formed of heat exchange plates and a shell surrounding it. The plate pack is made up of several plate pairs. Each plate pair is typically formed of two heat exchange plates that are welded together at least at their outer periphery. Each heat exchange plate has at least two openings for the flow of the first heat exchange medium. Adjacent plate pairs are attached together by welding or by otherwise combining the openings of two adjacent plate pairs to each other. Thus, the first heat exchange medium can flow from a plate pair to another through the openings in the plates. The second heat exchange medium is arranged to flow inside the shell in the spaces between the plate pairs. Inlet and outlet connections both for the first and the second heat exchange medium are arranged through the outer casing of the Plate & Shell plate heat exchanger. The inlet and outlet connection of the first heat exchange medium are arranged in connection with the inner parts of the plate pack. The primary circuit of the plate heat exchanger is thus formed between the inlet and outlet connection of the first heat exchange medium. The inlet and outlet connection of the second heat exchange medium are arranged in connection with the inside of the shell, that is, the outside of the plate pack. In other words, the secondary circuit of the plate heat exchanger is formed between the inlet and outlet connection of the second heat exchange medium, inside the shell, in the spaces between adjacent plate pairs. Typically, the primary and secondary circuits are separate from each other, that is, the first heat exchange medium flowing in the inner part of the plate pack cannot get mixed with the second heat exchange medium flowing in the shell, that is, outside the plate pack. Thus, the first heat exchange medium on the primary side flows in every other plate space and the second heat exchange medium on the secondary side flows in every other plate space of a plate heat exchanger. Leaking points may be formed in the heat exchange plates forming the plate pack or in the flow channels formed of the openings in the heat exchange plates, which can be easily repaired by the method according to the invention, without a need to break the structure of the plate pack.

In a method according to the invention the flow channel, that is, the plate space, between two adjacent plate pairs is closed by arranging a separate strip or a sealing tape in between the plate pairs. Typically the separate strip or sealing tape is arranged between plate pairs on the outer perimeter of the plate space, that is, on the outer surface of the plate pair to surround the whole plate pack. Thus the space between adjacent plate pairs is closed from the flow of the shell side. The strip or the sealing tape can be arranged into one or more spaces of plate pairs depending on the number and location of the leaking points in the plate pack.

The repairing method according to the invention is especially suitable for openable Plate&Shell-heat exchangers. In this case the flange joint of the end of the heat exchanger is opened and the leaking point of the plate pack is inspected. When the leaking plate space is located, the space between plate pairs adjacent to the leaking point is closed on its outer perimeter according to the repairing method according to the invention.

In case the outer casing including the shell and the end plates of the heat exchanger is built fully by welding, the shell has to be opened by flame cutting or a similar manner, in order to locate the leaking point of the plate pack, and the pack can be repaired according to the method according to the invention.

In one preferred embodiment of the invention, on the outer perimeter of the plate space, that is, on the outer surface of the plate pack, is welded a strip made of the same material than the plate pack. Typically the width of the strip is about 3-10 mm. The thickness of the strip can vary between 0.5-5 mm, depending on the pressure of the heat exchanger. The strip typically has a square or circular cross-section. The height or diameter of the strip corresponds to the plate space to be closed, so that the plate space can be tightly closed.

In the method according to the invention, the strip is typically welded to the outer perimeter of the plate space by using either an additive material-free TIG-welding method or methods using additive materials. Typically the strip is attached by welding to the upper and lower heat exchange plate of the plate space.

In another embodiment of the invention, the strip to be welded can be replaced by a sealing tape or similar to be tightened to the outer perimeter of the plate space, which tape has typically an O-ring shaped or wedge-shaped cross-section. The sealing tape is tightened into place by a separate band or another corresponding structure, for example a cable tie/ties. This embodiment of the invention can be used only in heat exchangers functioning at low pressures.

SHORT DESCRIPTION OF THE DRAWINGS

Figure 2:
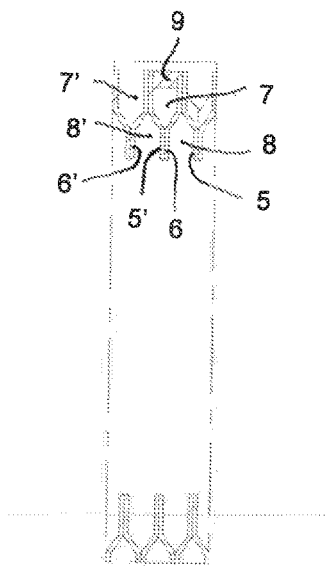
Figure 3:
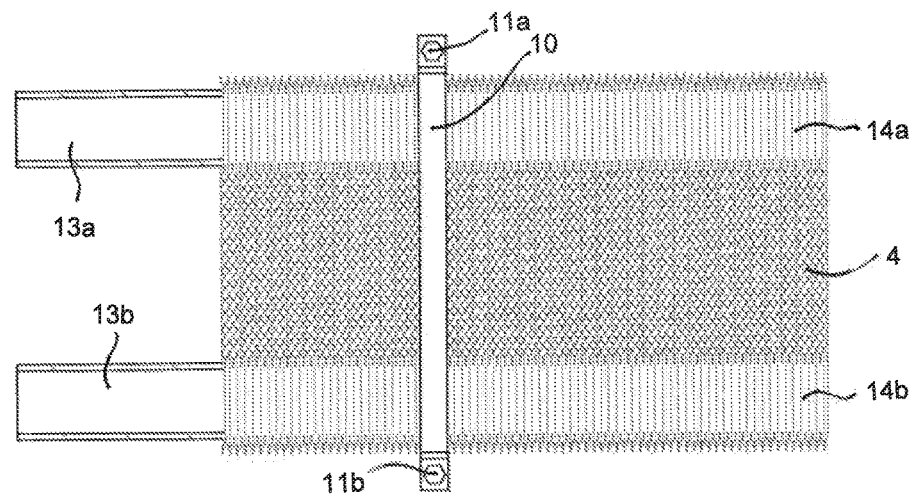

In the following, the invention will be described in more detail with reference to the appended drawings, in which FIG. 1 shows a Plate&Shell-type plate heat exchanger repaired with a method according to the invention, and FIGS. 2 and 3 show some repairing manners according to the invention for closing a plate space of a plate pack.

DETAILED DESCRIPTION OF THE INVENTION

Same reference numbers for similar parts are used in the embodiments shown in the Figures.

FIG. 1 shows an openable Plate&Shell-type heat exchanger 1 that comprises a plate pack 4 and an outer casing surrounding it, which comprises end plates 3a, 3b parallel to the ends and a shell 2 connecting the end plates. In the heat exchanger of the Figure, the second end plate 3b is arranged to be openable, thus it enables to remove the plate pack out of the shell and thus to easily repair the leaking point of the plate pack. An inlet connection 13*a* and an outlet connection 13*b* for a first heat exchange medium are arranged through the end plate 3*b* of the outer casing, which connections 13*a*, 13*b* are arranged in connection with the inner parts of the plate pack 4, that is, with the flow channels 14*a*, 14*b* formed of the openings of the heat exchange plates and the inner parts of the plate pairs. An inlet connection 12*a* and an outlet connection 12*b* for a second heat exchange medium are arranged through the shell 2 of the outer casing, which connections 12*a*, 12*b* are arranged in connection with the outside of the plate pack 4, whereby a secondary circuit of the plate heat exchanger is formed between the inlet and outlet connection of the second heat exchange medium.

The Figure also shows a strip 9, that has been used for repairing one plate space of the plate pack in such a manner that the strip 9 is arranged to the plate space on the whole length of the outer perimeter of the plate pack.

FIG. 2 shows as an enlargement a square repairing strip 9 arranged into one plate space 7 between plate pairs. The heat exchange plates 5 and 6, 5' and 6' arranged on top of each other form plate pairs, inside 8, 8' of which plate pairs flow the heat exchange medium of the pack side. The shell side heat exchange medium flows in the plate spaces 7, 7' of the plate pairs on top of each other. FIG. 2 shows a repairing according to the invention, whereby in the plate space 7 closed by the strip 9 flows the heat exchange medium of the pack side instead.

FIG. 3 shows a repairing method according to another embodiment of the invention, in which the plate space between plate pairs is closed with a separate sealing tape 10 that has been arranged on the outer perimeter of the plate pack. The sealing tape 10 has been attached tightly into place by fixing means 11*a*, 11*b* on both sides of the plate pack.

The invention is not intended to be limited to the above-presented exemplary embodiments, but the intention is to apply the invention widely within the inventive idea defined by the claims defined below.

The invention claimed is:

1. A method for repairing a leaking point in a plate pack of a plate heat exchanger comprised of a plate pack and a shell surrounding the plate pack, wherein the method comprises:
    (a) providing a plate pack comprised of heat exchange plates stacked on top of each other, the heat exchange plates having at least two openings and an outer perimeter which defines an outer surface of the plate pack, and wherein the heat exchange plates are attached to each other at least at the outer perimeter thereof to establish plate pairs such that the at least two openings of adjacent plate pairs are fluid-connected to each other and such that the plate pairs define inner plate-side spaces therebetween and adjacent plate pairs define outer shell-side spaces therebetween,
    (b) arranging the inner plate-side spaces the plate pairs so as to be fluid-connected with each other through flow channels formed by the at least two openings of the heat exchange plates to thereby establish a primary circuit of the heat exchanger to the inner plate-side spaces of the plate pairs,
    (c) arranging the outer shell-side plate spaces between the plate pairs so as to be fluid-connected with each other through the outer surface of the plate pack to thereby establish a secondary circuit of the heat exchanger in the outer shell-side spaces between adjacent plate pairs,
    (d) opening an end of the shell so as to allow access to and an identification of a leaking point in the plate pack;
    (e) closing a respective one of the outer shell-side spaces between adjacent plate pairs of the plate pack which is associated with the leaking point of the plate pack identified in step (d) by:
        (i) positioning a separate repair strip on the entire outer perimeter of the plate pack within the respective one of the outer shell-side spaces between the plate pairs on the outer perimeter of the plate pack associated with the leaking point so as to close the respective one of the outer shell-side spaces between the adjacent plate pairs associated with the leaking point, and
        (ii) sealing the respective one of the outer shell-side spaces between the adjacent plate pairs associated with the leaking point by welding the separate repair strip to the heat exchange plates of the adjacent plate pairs around its entire outer perimeter to thereby provide a repaired plate pack; and thereafter
    (f) closing the end of the shell with the repaired plate pack therewithin.

2. The method according to claim 1, wherein the separate repair strip and the heat exchange plates are formed of the same material.

3. The method according to claim 1, wherein the separate repair strip has a thickness of 0.5-5 mm.

4. The method according to claim 1, wherein the separate repair strip has a circular or square cross-section.

\* \* \* \* \*